US011422670B2

(12) United States Patent
Horii et al.

(10) Patent No.: US 11,422,670 B2
(45) Date of Patent: Aug. 23, 2022

(54) GENERATING A THREE-DIMENSIONAL VISUALIZATION OF A SPLIT INPUT DEVICE

(71) Applicant: Hewlett-Packard Development Company, L.P., Spring, TX (US)

(72) Inventors: Hiroshi Horii, Palo Alto, CA (US); Mithra Vankipuram, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/627,459

(22) PCT Filed: Oct. 24, 2017

(86) PCT No.: PCT/US2017/057986
§ 371 (c)(1),
(2) Date: Dec. 30, 2019

(87) PCT Pub. No.: WO2019/083501
PCT Pub. Date: May 2, 2019

(65) Prior Publication Data
US 2020/0249818 A1  Aug. 6, 2020

(51) Int. Cl.
*G06F 3/04815* (2022.01)
*G02B 27/01* (2006.01)
(Continued)

(52) U.S. Cl.
CPC ..... *G06F 3/04815* (2013.01); *G02B 27/0172* (2013.01); *G06F 3/0489* (2013.01);
(Continued)

(58) Field of Classification Search
CPC ............. G06F 3/04815; G06F 3/04886; G06F 3/0489; G06F 3/0216; G06F 3/0304;
(Continued)

(56) References Cited

U.S. PATENT DOCUMENTS 7,042,442 B1 * 5/2006 Kanevsky ............... G06F 3/017
345/157
9,652,050 B2   5/2017 Norwalk et al.
(Continued)

FOREIGN PATENT DOCUMENTS

CA      2398804      2/2004

OTHER PUBLICATIONS

Ng, Aaron "VR Text Input: Split Keyboard", Published Jan. 30, 2017 [online], [retrieved on Aug. 14, 2017] Available at:<https://medium.com/aaronn/vr-text-input-split-keyboard-e5b.

*Primary Examiner* — Daniel W Parcher
(74) *Attorney, Agent, or Firm* — Dicke Billig & Czaja PLLC

(57) ABSTRACT

A method includes providing a split input device that includes a left portion for use by a user's left hand, and a right portion for use by the user's right hand. The method includes capturing images of the split input device while the split input device is being used by the user in a split configuration in which the left portion is physically separated from the right portion, and generating a three-dimensional (3D) visualization of the split input device based on the captured images, wherein the split input device appears in the 3D visualization as a single input device in a combined configuration.

12 Claims, 5 Drawing Sheets

(51) Int. Cl.
  *G06F 3/04886* (2022.01)
  *G06T 19/00* (2011.01)
  *G06F 3/0489* (2022.01)

(52) U.S. Cl.
  CPC ........ *G06F 3/04886* (2013.01); *G06T 19/006* (2013.01); *G02B 2027/0138* (2013.01)

(58) Field of Classification Search
  CPC ................ G06F 3/011; G02B 27/0172; G02B 2027/0138; G06T 19/006; H04N 13/366
  See application file for complete search history.

(56) References Cited

U.S. PATENT DOCUMENTS

| | | | |
|---|---|---|---|
| 2002/0064382 A1* | 5/2002 | Hildreth | G06T 7/593 396/100 |
| 2006/0274045 A1 | 12/2006 | Stenbroten | |
| 2008/0166022 A1* | 7/2008 | Hildreth | G06T 7/254 382/107 |
| 2009/0138805 A1* | 5/2009 | Hildreth | H04N 21/64322 715/745 |
| 2010/0177035 A1* | 7/2010 | Schowengerdt | G06F 3/011 345/156 |
| 2010/0328204 A1 | 12/2010 | Edwards et al. | |
| 2011/0080490 A1* | 4/2011 | Clarkson | G06T 7/70 348/222.1 |
| 2013/0181897 A1* | 7/2013 | Izumi | G06F 3/017 345/156 |
| 2014/0006994 A1 | 1/2014 | Koch et al. | |
| 2014/0006996 A1 | 1/2014 | Ivankovic | |
| 2015/0084868 A1* | 3/2015 | Tenuta | G06F 3/04184 345/168 |
| 2015/0268730 A1* | 9/2015 | Walline | G06F 3/0393 345/168 |
| 2015/0316988 A1 | 11/2015 | Sugaya et al. | |
| 2016/0018985 A1 | 1/2016 | Bennet et al. | |
| 2016/0209928 A1* | 7/2016 | Kan | G06F 3/04886 |
| 2016/0299569 A1* | 10/2016 | Fisher | G02B 27/0172 |
| 2017/0010850 A1* | 1/2017 | Kobayashi | G02B 27/0093 |
| 2017/0315627 A1* | 11/2017 | Yao | G06F 3/0304 |

* cited by examiner

GENERATING A THREE-DIMENSIONAL VISUALIZATION OF A SPLIT INPUT DEVICE

BACKGROUND

Augmented reality (AR) systems and virtual reality (VR) systems may include a head-mounted display (HMD) that is tracked in the 3D workspace. These systems may also include controllers for each of the user's hands, which are also tracked. The systems allow the user to interact with the virtual world.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples disclosed herein are directed to a system that includes a split input device (e.g., a split keyboard or a split trackpad). The split input device includes a left portion for use by a user's left hand, and a right portion for use by the user's right hand. The split input device may be operated in a split configuration in which the left and right portions are physically separated, or may be operated in a combined configuration in which the left and right portions are physically combined into a single input device. The system captures images of the left portion and the right portion in the split configuration during use of the split input device, and generates a virtual reality (VR) representation of the split input device based on the captured images. In the VR representation, the split input device appears as a single input device in the combined configuration. In this manner, the user gets the ergonomic benefits of using a split input device, such as a split keyboard, while also receiving the benefit of visual feedback that includes a traditional keyboard view.

Figure 1:
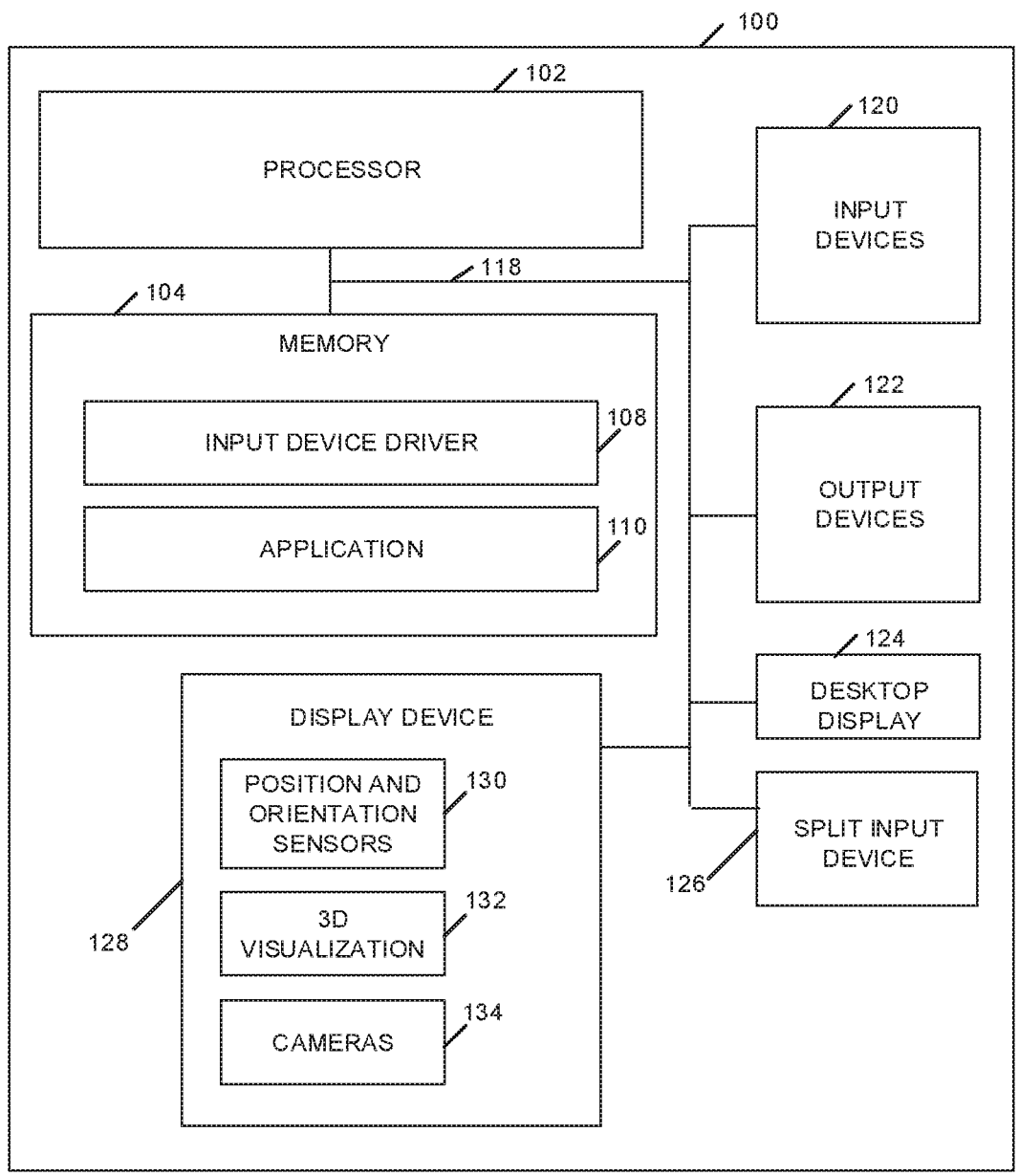
FIG. 1 is a block diagram illustrating a computing system with a split input device according to one example.

FIG. 1 is a block diagram illustrating a computing system 100 with a split input device according to one example. Computing system 100 includes at least one processor 102, a memory 104, input devices 120, output devices 122, desktop display 124, split input device 126, and display device 128. In the illustrated example, processor 102, memory 104, input devices 120, output devices 122, desktop display 124, split input device 126, and display device 128 are communicatively coupled to each other through communication link 118.

Input devices 120 include a keyboard, mouse, data ports, and/or other suitable devices for inputting information into system 100. Output devices 122 include speakers, data ports, and/or other suitable devices for outputting information from system 100.

Processor 102 includes a central processing unit (CPU) or another suitable processor. In one example, memory 104 stores machine readable instructions executed by processor 102 for operating the system 100. Memory 104 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 104 is non-transitory in the sense that it does not encompass a transitory signal but instead is made up of at least one memory component to store machine executable instructions for performing techniques described herein.

Memory 104 stores input device driver module 108 and application module 110. Processor 102 executes instructions of modules 108 and 110 to perform some techniques described herein. Module 108 receives user interaction information from split input device 126 indicating a user's interaction with the split input device 126. In some examples, the split input device 126 is a split keyboard, and the user interaction information includes key press information. In other examples, the split input device 126 is another type of input device (e.g., a split trackpad), and the user interaction information includes touch information or other information. Based on the received user interaction information, module 108 generates user interaction events, and provides the events to application module 110.

Module 108 also receives images from cameras 134 of display device 128. Cameras 134 capture images of a user's hands interacting with the split input device 126, and provide the captured images to module 108. Module 108 may manipulate or modify the received images, such as by combining separate images of left and right portions of the split input device 126 into a combined image, and outputs the combined image to application module 110. Based on the user interaction events and images received from module 108, application module 110 generates the 3D visualization 132 displayed by display device 128, which includes an AR/VR representation of the split input device 126 and shows the user interaction with the split input device 126. It is noted that some or all of the functionality of modules 108 and 110 may be implemented using cloud computing resources.

Display device 128 is a VR or AR display device, or other 3D output device, and includes position and orientation sensors 130 and cameras 134. The display device 128 displays a 3D visualization 132. In an example, the display device 128 may be a head-mounted display (HMD) device, such as a VR headset implementing stereoscopic images called stereograms to represent the 3D visualization 132. The 3D visualization 132 may include still images or video images. The VR headset may present the 3D visualization 132 to a user via a number of ocular screens. In an example, the ocular screens are placed in an eyeglass or goggle system allowing a user to view both ocular screens simultaneously. This creates the illusion of a 3D visualization using two individual ocular screens. The position and orientation sensors 130 may be used to detect the position and orientation of the VR headset in 3D space as the VR headset is positioned on the user's head, and the sensors 130 may provide this data to processor 102 such that movement of the VR headset as it sits on the user's head is translated into a change in the point of view within the 3D visualization 132.

Although one example uses a VR headset to present the 3D visualization, other types of environments may also be used. In an example, an AR environment may be used where aspects of the real world are viewable in a visual representation while a 3D object is being drawn within the AR environment. Thus, much like the VR system described herein, an AR system may include a visual presentation provided to a user via a computer screen or a headset including a number of screens, among other types of devices to present the 3D visualization. Thus, the present description contemplates the use of not only a VR environment but an AR environment as well.

In one example, the various subcomponents or elements of the system 100 may be embodied in a plurality of different systems, where different modules may be grouped or distributed across the plurality of different systems. To achieve its desired functionality, system 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Figure 2:
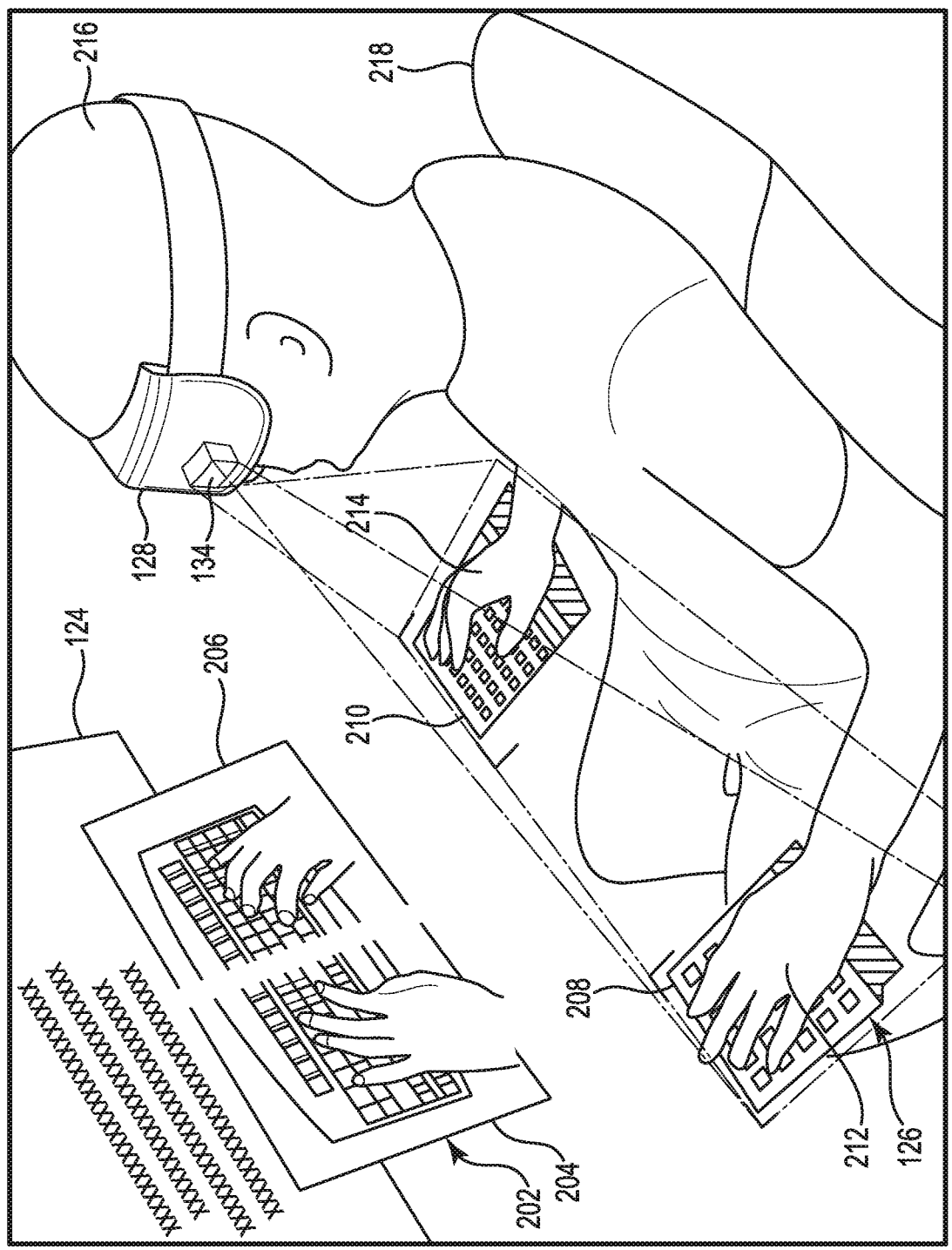
FIG. 2 is a diagram illustrating elements of the computing system shown in FIG. 1 being used by a user according to one example.

FIG. 2 is a diagram illustrating elements of the computing system 100 shown in FIG. 1 being used by a user according to one example. As shown in FIG. 2, a user 216 is sitting on a chair 218 in front of the desktop display 124 of the computing system, and is using the split input device 126. The split input device 126 includes a left portion 208 positioned on a left side armrest of the chair 218, and a right portion 210 positioned on a right side armrest of the chair 218. In the illustrated example, the split input device 126 is being operated in a split configuration in which the left portion 208 and right portion 210 are physically separated. The split input device 126 may also be operated in a combined configuration in which the left portion 208 and right portion 210 are physically combined into a single input device. The user 216 is operating the left portion 208 with the user's left hand 212, and is operating the right portion 210 with the user's right hand 214.

The user 216 is wearing display device 128, which is a VR headset in the illustrated example. The cameras 134 (FIG. 1) of the display device 128 are positioned to capture images of the split input device 126 and the user's hands 212 and 214 while the split input device 126 is being used by the user 216 in the split configuration. Thus, the cameras 134 are used to track the user's interaction with the split input device 126. The cameras 134 may include a single wide angle camera, or two cameras respectively mounted on the two sides of the VR headset.

The captured images (e.g., video feeds) are adjusted and spliced together by the modules 108 and 110 (FIG. 1) to create a joint keyboard experience in the AR/VR space. Specifically, the display device 128 displays a 3D visualization 132 (FIG. 1) based on the captured images, which includes a VR representation 202 of the split input device 126. The VR representation 202 includes a left portion 204 representing the left portion 208 of the split input device 126 and the user's left hand 212, and a right portion 206 representing the right portion 210 of the split input device 126 and the user's right hand 214. In the illustrated example, the left portion 204 and the right portion 206 of the VR representation 202 are positioned adjacent to each other, with little or no spacing between the portions 204 and 206 (e.g., less than 1 inch of separation), such that the split input device 126 appears in the VR representation 202 as a single input device in a combined configuration.

Figure 3:
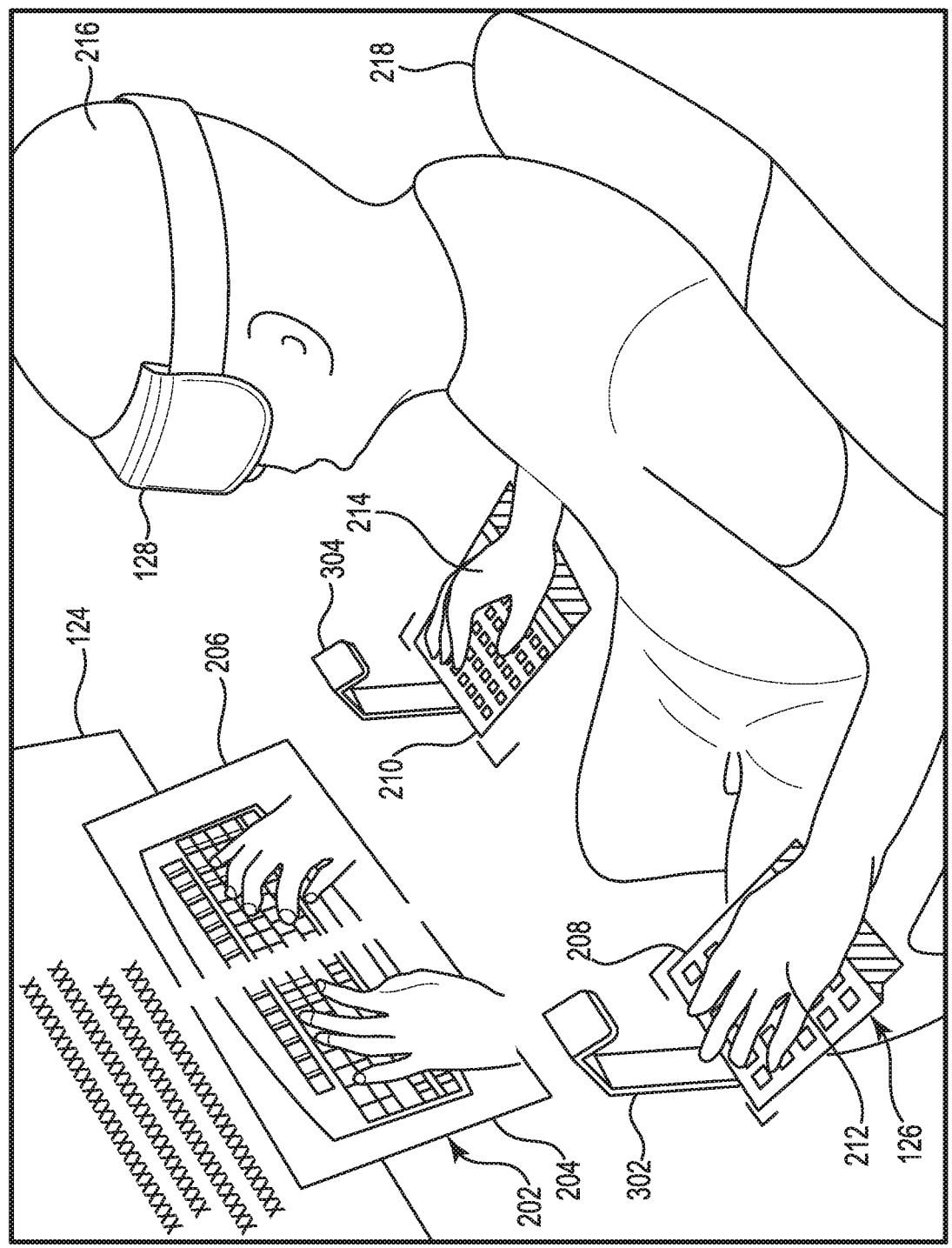
FIG. 3 is a diagram illustrating elements of the computing system shown in FIG. 1 being used by a user according to another example.

FIG. 3 is a diagram illustrating elements of the computing system 100 shown in FIG. 1 being used by a user according to another example. The example shown in FIG. 3 differs from the example shown in FIG. 2 in that, rather than using cameras 134 on the display device 128 to capture images of the split input device 126, a first camera 302 and a second camera 304 are used to capture images of the split input device 126. The first camera 302 may be mounted on the left portion 208 of the split input device 126 (or on the left armrest of the chair 218) and capture images of the user's left hand 212 interacting with the left portion 208. The second camera 304 may be mounted on the right portion 210 of the split input device 126 (or on the right armrest of the chair 218) and capture images of the user's right hand 214 interacting with the right portion 210. The images that are captured by cameras 302 and 304 are provided to input device driver module 108 (FIG. 1), and may be used to produce the VR representation 202 in which the split input device 126 appears as a single input device in a combined configuration.

In other examples, rather than using camera-based tracking of a user's interaction with the split input device 126, key-press based tracking may be used. In these examples, there is no camera involved in the tracking. Rather, the key press information sent from the split input device 126 to the module 108 is used by modules 108 and 110 to animate virtual hands to simulate hands making the key presses in the VR representation 202.

Figure 4:
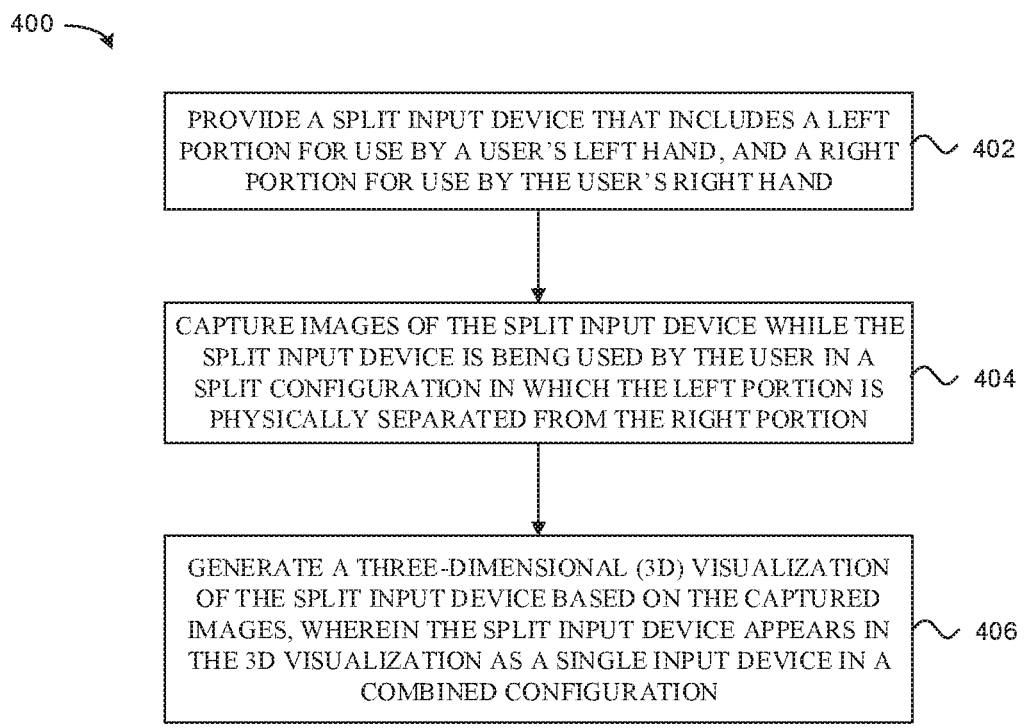
FIG. 4 is a flow diagram illustrating a method for generating a three-dimensional visualization of a split input device according to one example.

One example of the present disclosure is directed to a method for generating a three-dimensional visualization of a split input device. FIG. 4 is a flow diagram illustrating a method 400 for generating a three-dimensional visualization of a split input device according to one example. At 402 in method 400, a split input device that includes a left portion for use by a user's left hand, and a right portion for use by the user's right hand, is provided. At 404, images of the split input device are captured while the split input device is being used by the user in a split configuration in which the left portion is physically separated from the right portion. At 406, a three-dimensional (3D) visualization of the split input device is generated based on the captured images, wherein the split input device appears in the 3D visualization as a single input device in a combined configuration.

The 3D visualization in method 400 may be a virtual reality (VR) visualization or an augmented reality (AR) visualization. The captured images in method 400 may include images of the user's hands interacting with the split input device. The method 400 may further include generating representations of the user's hands as part of the 3D visualization based on the captured images.

Another example of the present disclosure is directed to a system, which includes a split input device that includes a left portion for use by a user's left hand, and a right portion for use by the user's right hand. The system includes a camera to capture images of the split input device while the split input device is being used by the user in a split configuration in which the left portion is physically separated from the right portion. The system includes a display device to display a three-dimensional (3D) visualization of the split input device based on the captured images, wherein the split input device appears in the 3D visualization as a single input device in a combined configuration.

The split input device in the system may be a split keyboard or a split trackpad. The display device may be a head-mounted display (HMD) device. The camera may be implemented on the HMD device. The camera may be a single wide angle camera. The camera may capture images of the left portion of the split input device, and the system may further comprise a second camera to capture images of the right portion of the split input device. The camera may be mounted on the left portion of the split input device, and the system may further comprise a second camera mounted on the right portion of the split input device.

Figure 5:
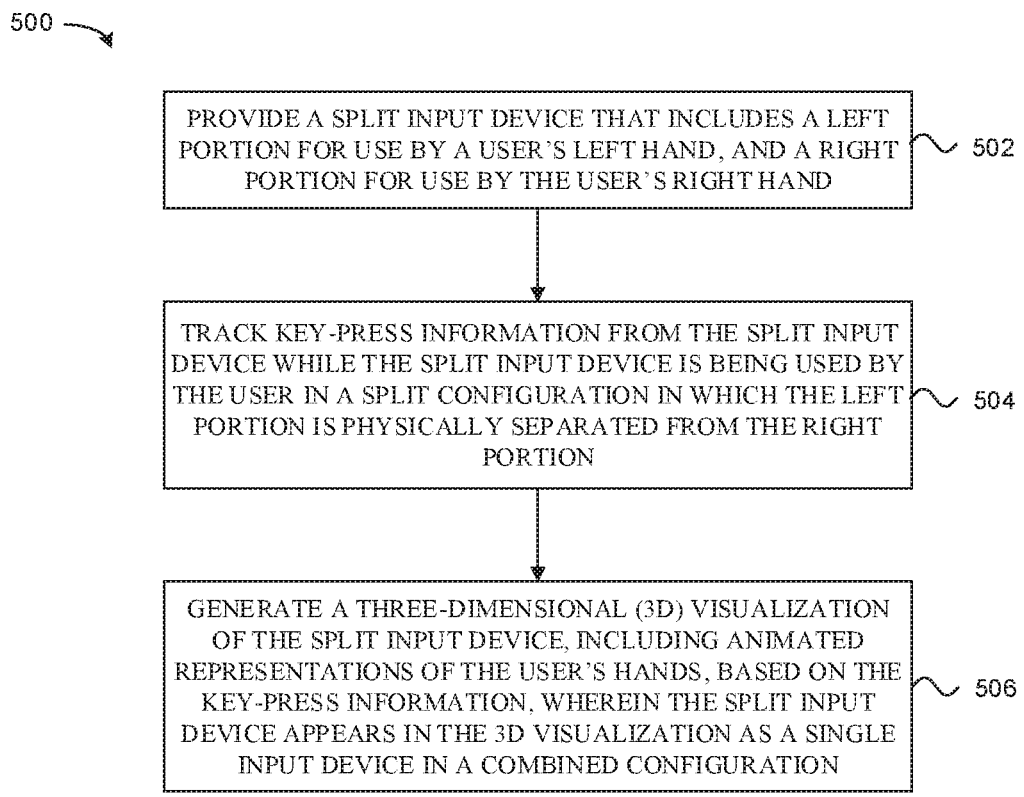
FIG. 5 is a flow diagram illustrating a method for generating a three-dimensional visualization of a split input device based on tracked key-press information according to one example.

Yet another example of the present disclosure is directed to a method for generating a three-dimensional visualization of a split input device based on tracked key-press information. FIG. 5 is a flow diagram illustrating a method 500 for generating a three-dimensional visualization of a split input device based on tracked key-press information according to one example. At 502 in method 500, a split input device that includes a left portion for use by a user's left hand, and a right portion for use by the user's right hand, is provided. At 504, key-press information from the split input device is tracked while the split input device is being used by the user in a split configuration in which the left portion is physically separated from the right portion. At 506, a three-dimensional (3D) visualization of the split input device, including animated representations of the user's hands, is generated based on the key-press information, wherein the split input device appears in the 3D visualization as a single input device in a combined configuration. The split input device in method 500 may be a split keyboard or a split trackpad.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
providing a split input device without a display and that is not a virtual representation of an input device, wherein the split input device includes a left portion for use by a user's left hand, and a right portion for use by the user's right hand, wherein the split input device is a split trackpad;
capturing images of the split input device while the split input device is being used by the user in a split configuration in which the left portion is physically separated from the right portion;
outputting user interaction information from the split input device while the split input device is being used by the user in the split configuration; and
generating a three-dimensional (3D) visualization of the split input device on a display device that is separate from the split input device, wherein the split input device appears in the 3D visualization as a single input device in a combined configuration, and wherein the 3D visualization with the split input device appearing as a single input device in a combined configuration is generated based on the captured images of the split input device being used in the split configuration.

2. The method of claim 1, wherein the 3D visualization is a virtual reality (VR) visualization.

3. The method of claim 1, wherein the 3D visualization is an augmented reality (AR) visualization.

4. The method of claim 1, wherein the captured images include images of the user's hands interacting with the split input device.

5. The method of claim 4, and further comprising:
generating representations of the user's hands as part of the 3D visualization based on the captured images.

6. A system, comprising:
a physical split input device without a display and separate from any display of the system, wherein the physical split input device without a display includes a left portion for use by a user's left hand, and a right portion for use by the user's right hand, and is to output user interaction information when used by the user, wherein the split input device is a split trackpad;
a camera to capture images of the physical split input device without a display while the physical split input device without a display is being used by the user in a split configuration in which the left portion is physically separated from the right portion; and
a display device separate from the physical split input device without a display to display a three-dimensional (3D) visualization of the physical split input device without a display, wherein the physical split input device without a display appears in the 3D visualization as a single input device in a combined configuration, and wherein the 3D visualization with the split physical input device without a display appearing as a single input device in a combined configuration is generated based on the captured images of the physical split input device without a display being used in the split configuration.

7. The system of claim 6, wherein the display device is a head-mounted display (HMD) device.

8. The system of claim 7, wherein the camera to capture images of the physical split input device without a display is implemented on the HMD device.

9. The system of claim 8, wherein the camera to capture images of the physical split input device without a display is a single wide angle camera.

10. The system of claim 8, wherein the camera to capture images of the physical split input device without a display captures images of the left portion of the physical split input device without a display, and wherein the system further comprises a second camera to capture images of the right portion of the physical split input device without a display.

11. The system of claim 6, wherein the camera to capture images of the physical split input device without a display is mounted on the left portion of the physical split input device without a display, and wherein the system further comprises a second camera mounted on the right portion of the physical split input device without a display to capture images of the physical split input device without a display.

12. A method, comprising:
providing a physical split input device without a display and that is not a virtual representation of an input device, wherein the physical split input device without a display includes a left portion for use by a user's left hand, and a right portion for use by the user's right hand, wherein the split input device is a split trackpad;

outputting key-press information from the physical split input device without a display while the physical split input device without a display is being used by the user in a split configuration in which the left portion is physically separated from the right portion; and generating a three-dimensional (3D) visualization of the physical split input device without a display on a display device that is separate from the physical split input device without a display, including animated representations of the user's hands, wherein the physical split input device without a display appears in the 3D visualization as a single input device in a combined configuration, and wherein the 3D visualization with the physical split input device without a display appearing as a single input device in a combined configuration is generated based on the key press information that is output while the physical split input device without a display is being used in the split configuration.

\* \* \* \* \*